United States Patent [19]
Pedziwiatr

[11] Patent Number: 5,433,102
[45] Date of Patent: Jul. 18, 1995

[54] ULTRASONIC WAVE ENERGY DETECTION AND IDENTIFICATION

[76] Inventor: Edward A. Pedziwiatr, 50 Glenview Ter., Cresskill, N.J. 07626

[21] Appl. No.: 35,463

[22] Filed: Mar. 23, 1993

[51] Int. Cl.⁶ .......................................... G01H 17/00
[52] U.S. Cl. ................... 73/1 DV; 73/649; 73/DIG. 8
[58] Field of Search ............... 73/649, 652, 661, 654, 73/1 DV, 866.5, 865.9, DIG. 8; 310/325, 326, 335, 336

[56] References Cited

U.S. PATENT DOCUMENTS

| | | | |
|---|---|---|---|
| 1,870,140 | 8/1932 | Piette | 73/649 |
| 2,615,940 | 10/1952 | Williams | 73/654 |
| 3,309,655 | 3/1967 | Von Ardenne | . |
| 4,033,178 | 7/1977 | Holt et al. | . |
| 4,386,612 | 6/1983 | Röder et al. | 73/632 |
| 4,466,288 | 8/1984 | Grynberg et al. | 73/654 |
| 4,566,334 | 1/1986 | Persson | 73/649 |
| 4,579,000 | 4/1986 | Sudo | 73/654 |
| 4,751,420 | 6/1988 | Gebhardt et al. | 73/649 |
| 4,843,866 | 7/1989 | Madsen et al. | 73/1 DV |

FOREIGN PATENT DOCUMENTS

| | | | |
|---|---|---|---|
| 0096224 | 6/1982 | Japan | 73/652 |
| 2222679 | 3/1990 | United Kingdom | 73/654 |

*Primary Examiner*—Thomas P. Noland
*Assistant Examiner*—Rose M. Finley
*Attorney, Agent, or Firm*—Samuelson & Jacob

[57] ABSTRACT

Apparatus and method for detecting the presence of ultrasonic wave energy at a selected location within a volume of material provides a visual display indicative of the ultrasonic wave energy at the selected location, and certain characteristics of the detected ultrasonic wave energy, by coupling with the volume of material, at the selected location, a column of ultrasonic wave energy responsive fluid medium with ultrasonic wave energy responsive visible particles suspended therein so as to induce corresponding ultrasonic wave energy in the column whereby the particles are suspended in the column and are arranged in a visible pattern to establish the visual display indicative of the ultrasonic wave energy at the selected location.

22 Claims, 1 Drawing Sheet

ULTRASONIC WAVE ENERGY DETECTION AND IDENTIFICATION

The present invention relates generally to the detection and identification of characteristics of ultrasonic wave energy and pertains, more specifically, to apparatus and method for detecting the presence of ultrasonic wave energy at selected locations within a volume of material, such as ultrasonic wave energy within a bath of liquid in an ultrasonic cleaning machine, and identifying certain characteristics of the detected ultrasonic wave energy.

The advantages of ultrasonic cleaning are long established and a wide range of ultrasonic cleaning apparatus and techniques has been developed in efforts to increase the effectiveness of ultrasonic cleaning. Among the most prevalent apparatus and techniques are those in which articles to be cleaned are immersed in a bath of ultrasonic wave energy responsive liquid within which ultrasonic wave energy is induced, through the use of ultrasonic transducers coupled with the tank in which the bath is held. Ultrasonic cleaning machines which utilize such techniques usually employ ultrasonic wave energy at about either twenty kHz, forty kHz or eighty kHz. While various advantages and disadvantages have been attributed to ultrasonic cleaning carried out with ultrasonic wave energy at each of these frequencies, the industry has lacked the ability to detect and identify, in a simple and effective manner, the presence of ultrasonic wave energy in a cleaning bath, and certain characteristics of the ultrasonic wave energy, at selected locations in the bath. For example, while it is known that ultrasonic cleaning is effected by cavitation induced within the ultrasonic wave energy responsive liquid in the cleaning bath, the presence or absence of effective cavitation at any selected location in the cleaning bath has eluded detection by simple and effective apparatus and techniques.

The present invention provides apparatus and method for detecting the presence of ultrasonic wave energy within a volume of material and for identifying certain characteristics of the detected ultrasonic wave energy. As such, the present invention attains several objects and advantages, some of which are summarized as follows: Provides simple and effective apparatus and techniques for quickly detecting the presence of ultrasonic wave energy in a given material and identifying certain characteristics of the ultrasonic wave energy at selected locations within a volume of the material; demonstrates certain characteristics of ultrasonic wave energy in creating effective cleaning conditions at different frequencies employed in an ultrasonic cleaning bath; enables an immediate determination of the effectiveness of ultrasonic wave energy at various locations within an ultrasonic cleaning bath; exhibits a dramatic and vivid visual display which clearly detects the presence of ultrasonic wave energy at various selected locations within a given volume of material, and identifies certain characteristics of the detected ultrasonic wave energy; provides economical and highly effective apparatus and techniques amenable to widespread use in evaluating the effectiveness of ultrasonic wave energy in various ultrasonic cleaning applications.

The above objects and advantages, as well as further objects and advantages, are attained by the present invention which may be described briefly as apparatus and method for detecting the presence of ultrasonic wave energy at a selected location within a volume of material by providing a visual display indicative of the ultrasonic wave energy at the selected location, and certain characteristics of the detected ultrasonic wave energy, by coupling with the volume of material, at the selected location, a column of ultrasonic wave energy responsive fluid medium with ultrasonic wave energy responsive visible particles suspended therein so as to induce corresponding ultrasonic wave energy in the column whereby the visible particles are arranged in a visible pattern to establish the visual display indicative of the ultrasonic wave energy at the selected location.

The invention will be understood more fully, while still further objects and advantages will become apparent, in the following detailed description of preferred embodiments of the invention illustrated in the accompanying drawing, in which.

Figure 1:
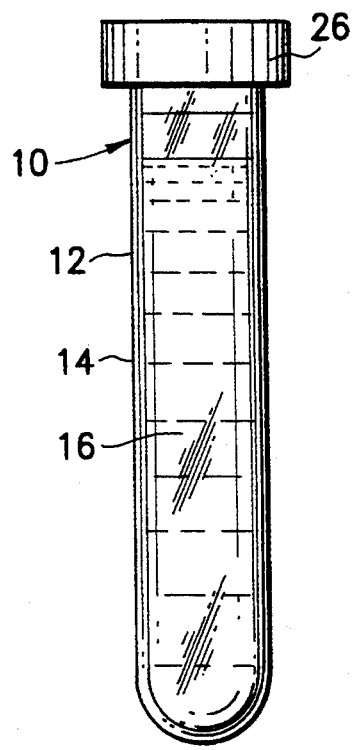
FIG. 1 is an elevational view of an apparatus constructed in accordance with the present invention.
Figure 2:
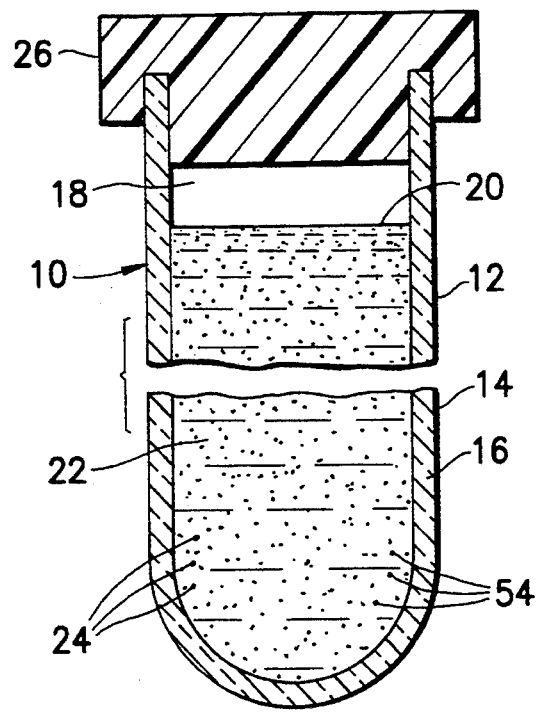
FIG. 2 is an enlarged, longitudinal cross-sectional view of the apparatus.

Referring now to the drawing, and especially to FIGS. 1 and 2 thereof, an apparatus constructed in accordance with the present invention is illustrated in the form of a probe 10 which is seen to include a tubular member 12 in the form of a cylindrical tube 14 having a transparent wall 16 establishing a chamber 18 inside the tubular member 12. A fluid medium is contained within the chamber 18 and is shown in the form of a column 20 of ultrasonic wave energy responsive liquid 22 within which is suspended finely divided particles 24 of a material which is visible and which responds to ultrasonic wave energy in a manner which will be described in detail below. A cap 26 seals the column 20 within the tubular member 12.

Liquid 22 is an ultrasonic wave energy responsive liquid medium of a type well known in ultrasonic cleaning and preferably is selected from available chlorinated, fluorinated and hydrocarbon solvents. Some examples of suitable solvents include methylene chloride, fluorinated solvents known as FREON, 1-1-1-trichlorethane or 1-1-1-trichlorethylene, and perchlorethylene. The preferred materials for particles 24 are dense metal powders. Finely divided silver or gold, in particle sizes as small as those employed as pigments, are most preferable in that these materials are quite dense, offer a high degree of visibility and are resistant to corrosion. Tubular member 12 may be constructed of quartz, or another transparent material, and is most economically made of glass.

Figure 3:
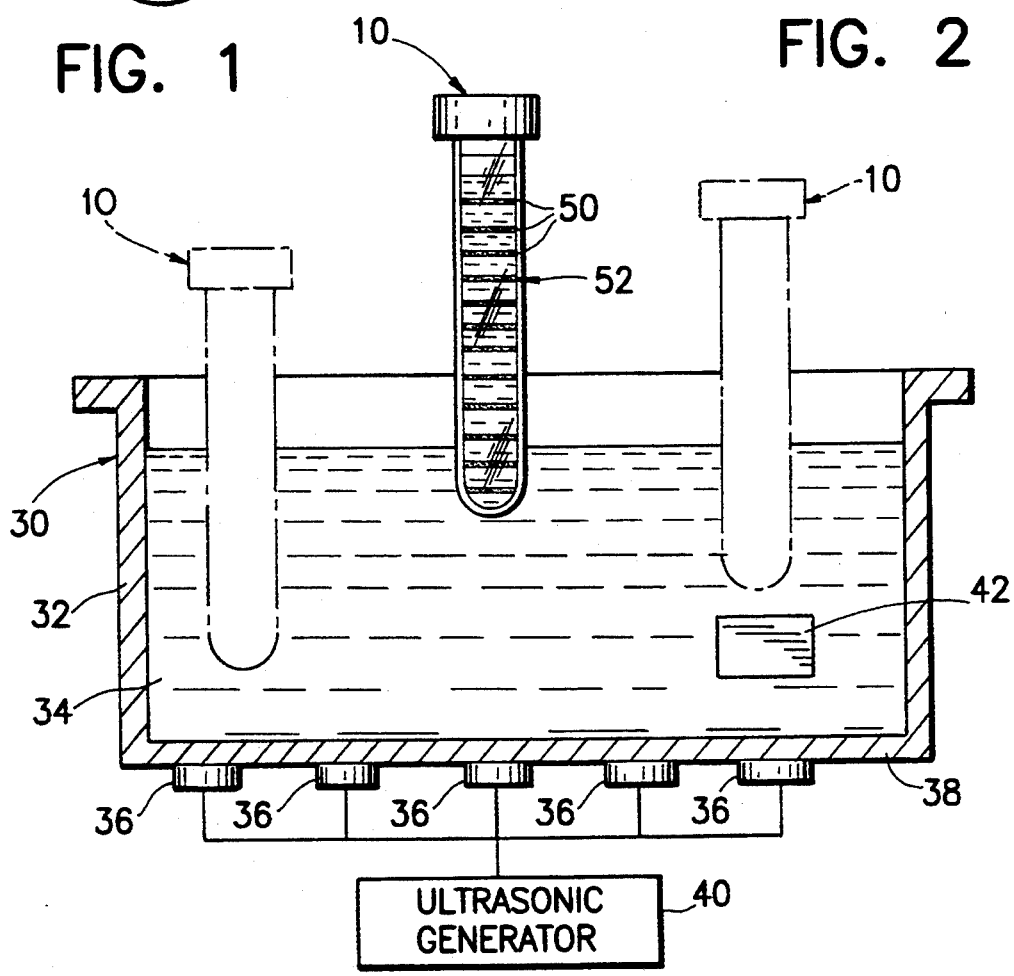
FIG. 3 is a partially diagrammatic illustration showing the apparatus in use in carrying out the method of the present invention.

Turning now to FIG. 3, an ultrasonic cleaning machine is illustrated diagrammatically at 30 and is seen to include a tank 32 within which is a bath 34 of ultrasonic wave energy responsive cleaning fluid. A plurality of ultrasonic transducers 36 are affixed to the outside of the bottom 38 of the tank 32, in a now well-known manner, and an ultrasonic generator 40 is connected to the transducers 36. An article 42 to be cleaned is immersed in the bath 34 for a conventional ultrasonic cleaning operation. Probe 10 is employed to detect the presence of ultrasonic wave energy within the volume of material which constitutes the bath 34, and to identify certain characteristics of the detected ultrasonic wave energy. Thus, probe 10 is coupled with the material of the bath 34 by inserting the probe 10 into the bath 34, as shown, maintaining the probe 10, and the column 20 in the probe 10, in an essentially vertical orientation. The vertical orientation places the column 20 essentially parallel with the direction in which the ultrasonic wave energy propagates from the transducers 36 through the bath 34.

Upon so coupling the probe 10 with the bath 34, the ultrasonic wave energy in the bath 34, at the location where the probe 10 is placed, will induce like ultrasonic wave energy in the column 20 in the chamber 18 of the probe 10. The visible particles 24 then become arranged along visible bands 50 which extend transversely across the column 20, in a generally horizontal direction essentially normal to the direction of propagation of the ultrasonic wave energy in the bath 34. The visible bands 50 are spaced apart vertically and establish a visual display 52 in the form of a pattern of visible bands 50 indicative of the presence of ultrasonic wave energy at the location where the probe 10 is coupled with the material of the bath 34. It has been found that the vertical spacing of these visible bands 50 corresponds to the spacing of bands of cavitation in the bath 34, referred to as power bands, or standing waves. Since ultrasonic cleaning takes place only at those locations in the bath 34 where there is cavitation, probe 10 provides an essentially immediate, vivid and dramatic visual indication of where cleaning will take place, thereby enabling a rapid evaluation of the cleaning effectiveness of the ultrasonic wave energy in the bath 34. Where the frequency of the detected ultrasonic wave energy is twenty kHz, the visible bands 50 are spaced apart vertically by about one inch. Where the frequency of the detected ultrasonic wave energy is forty kHz, the visible bands 50 are spaced apart vertically approximately one-half inch. At a frequency of eighty kHz, the visible bands 50 are about one-quarter inch apart, a spacing so small as to indicate that cavitation is effective for cleaning essentially throughout the full depth of the bath 34. Thus, probe 10 provides a clearly visible detection of the frequency of the ultrasonic wave energy in bath 34 and demonstrates the effectiveness of the cleaning provided by each frequency, by illustrating the characteristics of the cavitation induced in the bath 34 by each frequency.

While the frequency of the ultrasonic wave energy is displayed by the spacing of the visible bands 50 in the column 20, the intensity of the ultrasonic wave energy at any selected location in the bath 34 is indicated by the sharpness and definition of the visible bands 50. Thus, the higher the power or intensity of the detected ultrasonic wave energy, the narrower and more well-defined will be the individual visible bands 50. By moving the probe 10 to selected locations in the bath 34, as illustrated by the alternate positions of probe 10 shown in phantom in FIG. 3, the visual display 52 will provide an indication of the intensity of the ultrasonic wave energy at each selected location. In this manner, probe 10 is utilized not only to determine levels of power, but also to locate dead spots in the bath 34, which dead spots usually occur as a result of poor placement or poor performance of one or more of the transducers 36. In addition, since ultrasonic wave energy is highly directional, probe 10 is available to detect shadowing which may occur in the vicinity of the article 42 being cleaned, such shadowing being the result of absorption of ultrasonic wave energy by the article 42, in the vicinity of the article 42.

In order to enhance the visibility of the bands 50 of visible particles 24, further visible material may be suspended within liquid 22 of column 20, the further visible material being selected from materials which will not respond to ultrasonic wave energy as does the material of particles 24, so that the further visible material provides a contrasting background against which the particles 24 are better defined visually. Pigmented synthetic polymeric materials are available for the purpose, the preferred material being a darker-colored acrylic resin placed in the column 20 in particles 54 having a particle size small enough to be suspended in liquid 22, along with the visible particles 24.

It will be seen that the present invention attains the several objects and advantages summarized above, namely: Provides simple and effective apparatus and techniques for quickly detecting the presence of ultrasonic wave energy in a given material and identifying certain characteristics of the ultrasonic wave energy at selected locations within a volume of the material; demonstrates certain characteristics of ultrasonic wave energy in creating effective cleaning conditions at different frequencies employed in an ultrasonic cleaning bath; enables an immediate determination of the effectiveness of ultrasonic wave energy at various locations within an ultrasonic cleaning bath; exhibits a dramatic and vivid visual display which clearly detects the presence of ultrasonic wave energy at various selected locations within a given volume of material, and identifies certain characteristics of the detected ultrasonic wave energy; provides economical and highly effective apparatus and techniques amenable to widespread use in evaluating the effectiveness of ultrasonic wave energy in various ultrasonic cleaning applications.

It is to be understood that the above detailed description of preferred embodiments of the invention are provided by way of example only. Various details of design, construction and procedure may be modified without departing from the true spirit and scope of the invention as set forth in the appended claims.

The embodiments of the invention in which an exclusive property or privilege is claimed are defined as follows:

1. Apparatus for detecting the presence of ultrasonic wave energy at a selected location within a volume of material to provide a visual display indicative of the ultrasonic wave energy at the selected location and characteristics of the detected ultrasonic wave energy, the apparatus comprising:
    a chamber having a wall;
    a fluid medium inside the chamber, in a column extending in a direction along the wall of the chamber; and
    visible particles within the fluid medium inside the chamber for suspension within the column;
    at least a portion of the wall of the chamber being transparent adjacent the column for enabling viewing of the column from outside the chamber;
    the column of fluid medium with the visible particles therein being responsive to ultrasonic wave energy such that in the presence ultrasonic wave energy in the column, the particles are suspended in the column and are arranged in a visible pattern indicative of the ultrasonic wave energy, whereby upon coupling the apparatus with the selected location, the visible pattern provides the visual display.

2. The invention of claim 1 wherein the visible particles comprise finely divided metal particles.

3. The invention of claim 2 wherein the metal particles comprise a relatively dense metal powder.

4. The invention of claim 2 wherein the metal particles are silver.

5. The invention of claim 1 wherein the fluid medium includes an ultrasonic wave energy responsive liquid.

6. The invention of claim 5 wherein the ultrasonic wave energy responsive liquid includes a chlorinated solvent.

7. The invention of claim 5 wherein the visible particles comprise finely divided metal particles.

8. The invention of claim 5 wherein the fluid medium includes a chlorinated solvent and the metal particles are silver.

9. The invention of claim 1 including further visible material in the fluid medium, the further visible material being relatively unresponsive to the detected ultrasonic wave energy for providing a contrasting background against which viewing of the suspended and arranged visible particles is enhanced.

10. The invention of claim 9 wherein the further visible material comprises particles of synthetic polymeric material.

11. The invention of claim 10 wherein the synthetic polymeric material is an acrylic resin.

12. The invention of claim 1 wherein the chamber comprises a tubular member of transparent material.

13. The invention of claim 12 wherein the transparent material is glass.

14. A method for detecting the presence of ultrasonic wave energy at a selected location within a volume of material to provide a visual display indicative of the ultrasonic wave energy at the selected location and characteristics of the detected ultrasonic wave energy, the method comprising: coupling with the volume of material, at the selected location, a column of ultrasonic wave energy responsive fluid medium with ultrasonic wave energy responsive visible particles suspended therein so as to induce corresponding ultrasonic wave energy in the column whereby the particles are suspended in the column and are arranged in a visible pattern to establish the visual display indicative of the ultrasonic wave energy at the selected location.

15. The invention of claim 14 including aligning the column in a direction parallel to the direction in which the ultrasonic wave energy is propagated such that the visible pattern includes visible bands extending transverse to the column and spaced apart along the column.

16. A probe responsive to the presence of ultrasonic wave energy within a given material to provide a visual display indicative of the wave energy in the given material, the probe comprising:

a chamber having a wall; and visible particles within a fluid medium inside the chamber, in a column extending in a direction along the wall of the chamber for suspension within the column;

at least a portion of the wall of the chamber being transparent adjacent the column for enabling viewing of the column from outside the chamber;

the column of fluid medium with the visible particles therein being responsive to ultrasonic wave energy such that in the presence ultrasonic wave energy in the column, the particles are suspended in the column and are arranged in a visible pattern indicative of the ultrasonic wave energy, whereby upon coupling the probe with the given material, the visible pattern provides the visual display.

17. The invention of claim 16 wherein the visible particles comprise finely divided dense metal particles.

18. The invention of claim 17 wherein the metal particles are silver.

19. The invention of claim 16 wherein the fluid medium includes an ultrasonic wave energy responsive liquid.

20. The invention of claim 16 including further visible material in the fluid medium, the further visible material being relatively unresponsive to the detected ultrasonic wave energy for providing a contrasting background against which viewing of the suspended and arranged visible particles is enhanced.

21. The invention of claim 16 wherein the chamber comprises a tubular member of transparent material.

22. The invention of claim 21 wherein the transparent material is glass.

* * * * *